US008529845B2

(12) United States Patent
Kois

(10) Patent No.: US 8,529,845 B2
(45) Date of Patent: Sep. 10, 2013

(54) BRINE MAKER

(75) Inventor: Ernest J. Kois, Boulder, CO (US)

(73) Assignee: Kois Brother Equipment Co., Commerce City, CO (US)

( * ) Notice: Subject to any disclaimer, the term of this patent is extended or adjusted under 35 U.S.C. 154(b) by 309 days.

(21) Appl. No.: 12/862,968

(22) Filed: Aug. 25, 2010

(65) Prior Publication Data

US 2012/0051982 A1 Mar. 1, 2012

(51) Int. Cl.

| | |
|---|---|
| ***B01D 11/02*** | (2006.01) |
| ***B01D 12/00*** | (2006.01) |
| ***B01D 15/00*** | (2006.01) |
| *B67D 7/06* | (2010.01) |

(52) U.S. Cl.
USPC ...... 422/261; 222/180; 222/180.1; 222/185.1

(58) Field of Classification Search
USPC .................... 422/261; 222/180, 180.1, 185.1
See application file for complete search history.

(56) References Cited

U.S. PATENT DOCUMENTS

| | | | | |
|---|---|---|---|---|
| 1,351,251 | A * | 8/1920 | Jewell | 222/288 |
| 2,594,072 | A * | 4/1952 | Ridley | 222/241 |
| 3,412,883 | A * | 11/1968 | Birdsall | 414/470 |
| 3,741,532 | A * | 6/1973 | Farnham et al. | 366/7 |
| 4,439,115 | A * | 3/1984 | Nesseth et al. | 417/460 |
| 5,819,776 | A | 10/1998 | Kephart | |
| 6,422,789 | B1 * | 7/2002 | Brewer | 405/128.75 |
| 6,439,252 | B1 | 8/2002 | Kephart | |
| 6,451,270 | B1 | 9/2002 | Killian et al. | |
| 6,736,153 | B1 | 5/2004 | Kime | |
| 7,186,390 | B1 | 3/2007 | Hellbusch et al. | |
| 2006/0207230 | A1 * | 9/2006 | DeMarco | 55/319 |
| 2007/0160452 | A1 * | 7/2007 | Kerwin | 414/722 |
| 2010/0269860 | A1 * | 10/2010 | Vogel | 134/10 |

* cited by examiner

*Primary Examiner* — Regina M Yoo
(74) *Attorney, Agent, or Firm* — Russell T. Manning; Marsh Fischmann & Breyfogle LLP

(57) ABSTRACT

Provided herein is an admixing apparatus and system that in various arrangements may be utilized to produce deicing solutions including salt brines. To facilitate cleaning of the interior of the device, a mixing hopper is utilized that includes a side access opening that allows for readily accessing the interior of the hopper and removing any sediment that has accumulated herein.

15 Claims, 7 Drawing Sheets

BRINE MAKER

FIELD

Presented is a system, apparatus and method (i.e., utility) for admixing solid materials with solvents to produce a liquid solution. In one arrangement, the utility is directed to a brine maker that dissolves salt into water to produce a brine that is suitable for use as a snow and ice remover.

BACKGROUND

It is a common practice in many regions where subfreezing conditions occur to apply solutions to roadways, runways, and the like that facilitate melting and/or removal of snow and ice. For instance, highway snow and ice control is typically carried out by governmental entities utilizing plows to remove snow and ice and/or sanders that apply particulates to roadways. In the latter regard, such particulate may be a mixture of sand and/or salts (e.g., sodium chloride, calcium magnesium acetate (CMA)), which may melt snow/ice on a roadway. While CMA is sometimes used, rock salt is the most commonly utilized deicer. In such arrangements, a mixture of sand and salt granules may be spread onto a roadway.

In addition to solid application, it has also been recognized that the application of liquid deicers provide significant benefits. For instance, it has been recognized that application of liquid deicers may more readily melt ice formed on a surface or the application of liquid deicer prior to the accumulation of snow or ice may reduce the adhesion of the snow and ice to the surface and thereby improve removal of the same and/or limit the buildup thereof. Further, if properly applied, the application of a liquid deicer can prevent road surfaces from freezing in the first place.

Such liquid deicing solutions may generally be created by directing a liquid solvent (e.g., water) through an amount of a chemical to be dissolved, such as rock salt or CMA, to produce a highly concentrated or saturated solution. For instance, it has been found that a solution of approximately 23.3% NACL by weight in water is an efficient solution for removing ice and snow. At this salinity level, the solution will melt ice and snow with ambient temperatures as low as about −11° Fahrenheit.

In highway maintenance applications, large quantity of such salt brine may be required to adequately cover multiple streets, highways, etc. Accordingly, most highway maintenance crews typically prepare and store salt brine for application. That is, most highway maintenance crews have stores of solid salts or CMA pellets they dissolve into water to generate 'brine solutions.' As will be appreciated, it may also be necessary to produce such brine solutions to augment or replace the solution as it is utilized. Accordingly, many such entities have brine producing devices at their facility.

Various brine producing devices have been proposed. A number of these devices produce a brine solution by directing water through a columnar container holding salt or CMA pellets where water enters at the bottom of the container (e.g., salt hopper) and overflows through an outlet at the top of the container. In such an arrangement, prior to being removed from the top of the container, the liquid may be recirculated to achieve a desired salinity. Other brine producing devices introduce water at the top of a container/hopper holding salt or chemical pellets and allow the water to drain through the container. Again, this solution may be recirculated to achieve desired salinity. The resulting brine is collected and typically pumped into a holding tank.

While the process for generating such brines is straightforward, a number of difficulties exist in the actual implementation of this process. One particular problem lies in the amount of sediment that is included with raw salts. That is, commercial rock salt can be quite dirty and may include significant percentages (e.g., 10% or more) of sediment/dirt. This sediment and dirt collects in the salt hopper. Accordingly, it is necessary to periodically clean the brine making apparatus. However, cleaning of these apparatuses has heretofore been a labor-intensive process. In many brine apparatus designs, an operator may have to climb into the hopper itself and physically remove the sediment. Other arrangements have allowed for removing and dumping the hopper. Due to these difficulties, crews often fail to clean or adequately clean these devices. This can result in various fluid inlets or outlets becoming plugged by either sediment or solidified brine (i.e., salt cake). Accordingly, these devices may not be readily available when needed.

SUMMARY

Provided herein is an admixing apparatus and system that in various arrangements may be utilized to produce deicing solutions including salt brines. To facilitate cleaning of the interior of the device, a mixing hopper is utilized that includes a side access opening that allows for readily accessing the interior of the hopper and removing any sediment that has accumulated herein.

According to a first aspect, an apparatus is provided for admixing solids with a solvent to produce a liquid solution. The apparatus includes a hopper having one or more sidewalls and a bottom surface. A portion or an entirety of the upper end of the hopper is open to facilitate placement of solid materials therein. A side gate extends across at least a portion of a width of one of the sidewalls. This side gate moves between an open position and a closed position relative to an opening in that sidewall. In an open position, an edge of the bottom surface of the hopper is exposed. In the closed position, the side gate covers the opening and seals with the sidewall such that the gate, sidewalls, and bottom surface form a liquid-tight tank. The device further includes a fluid inlet for introducing water into the hopper and a fluid outlet extending through the bottom surface. A pump may circulate water through the fluid inlet and/or outlet. In such an arrangement, water may spray over materials in the hopper, filter to the bottom of the hopper, drain from the hopper and/or recirculate through the fluid inlet. This may allow for increasing the salinity of water passing over salt in the hopper. Accordingly, the device may include various valves, pumps, and plumbing to permit such circulation. Furthermore, the device may be connectable to a storage tank such that upon the fluid achieving a desired concentration (e.g., salinity) fluid may be removed from the hopper and stored in the tank.

In one arrangement, the fluid outlet disposed through the bottom surface of the hopper is isolated from the interior of the hopper by a screen. In one arrangement, an edge surface of this screen engages the side gate when the side gate is in a closed position. Accordingly, when the side gate is in the open position, the area under the screen including the outlet is exposed.

To permit the side gate to effectively seal with the sidewall of the hopper, a seal or gasket is typically disposed about the periphery of the side gate and/or the mating surface of the hopper. Such a seal may be formed of any appropriate materials.

In one arrangement, the bottom surface of the hopper slopes across a width or other cross dimension of the interior of the hopper. In such an arrangement, the edge of the bottom surface that is exposed when the side gate is opened may be a lower edge of this sloping bottom surface. In this regard, the hopper may drain when the side gate is open. Further, the bottom surface may continuously slope from a first sidewall or inner edge to a second sidewall of the hopper, which includes the side gate. In one arrangement, the slope of this bottom surface is at least about 10° and less than about 45°.

The side gate may be interconnected to the hopper in any manner that allows for the gate to move between an open and closed position so long as the side gate closes and seals an opening through the side surface of the hopper. In one arrangement, the side gate may extend entirely across the width of the hopper. In other arrangements, the side gate may extend across less than the entirety of the width of a sidewall. To operate the gate, one or more latching mechanisms may be interconnected thereto. Such latching mechanisms may include hydraulic actuators as well as mechanical latches that permit securing the gate relative to the hopper.

The brine maker may further include control circuitry that allows for a portion or all of the functions of the system to be automated. In this regard, various floats may be provided that allow for automatically filling a water level in the hopper to a desired level. Other floats may provide information regarding the salinity level of a fluid within the hopper. In further arrangements, salinity measurement devices may be interconnected to measure the salinity of the brine solution. Such devices may be interconnected to plumbing and/or outlets of the hopper.

BRIEF DESCRIPTION OF THE DRAWINGS

For a more complete understanding of the present disclosure and further advantages thereof, reference is now made to the following detailed description taken in conjunction with the drawings in which.

DETAILED DESCRIPTION

Reference will now be made to the accompanying drawings, which at least assist in illustrating the various pertinent features of the presented inventions. In this regard, the following description is presented for purposes of illustration and description. Furthermore, the description is not intended to limit the disclosed embodiments of the inventions to the forms disclosed herein. Consequently, variations and modifications commensurate with the following teachings, and skill and knowledge of the relevant art, are within the scope of the presented inventions.

Figure 1:
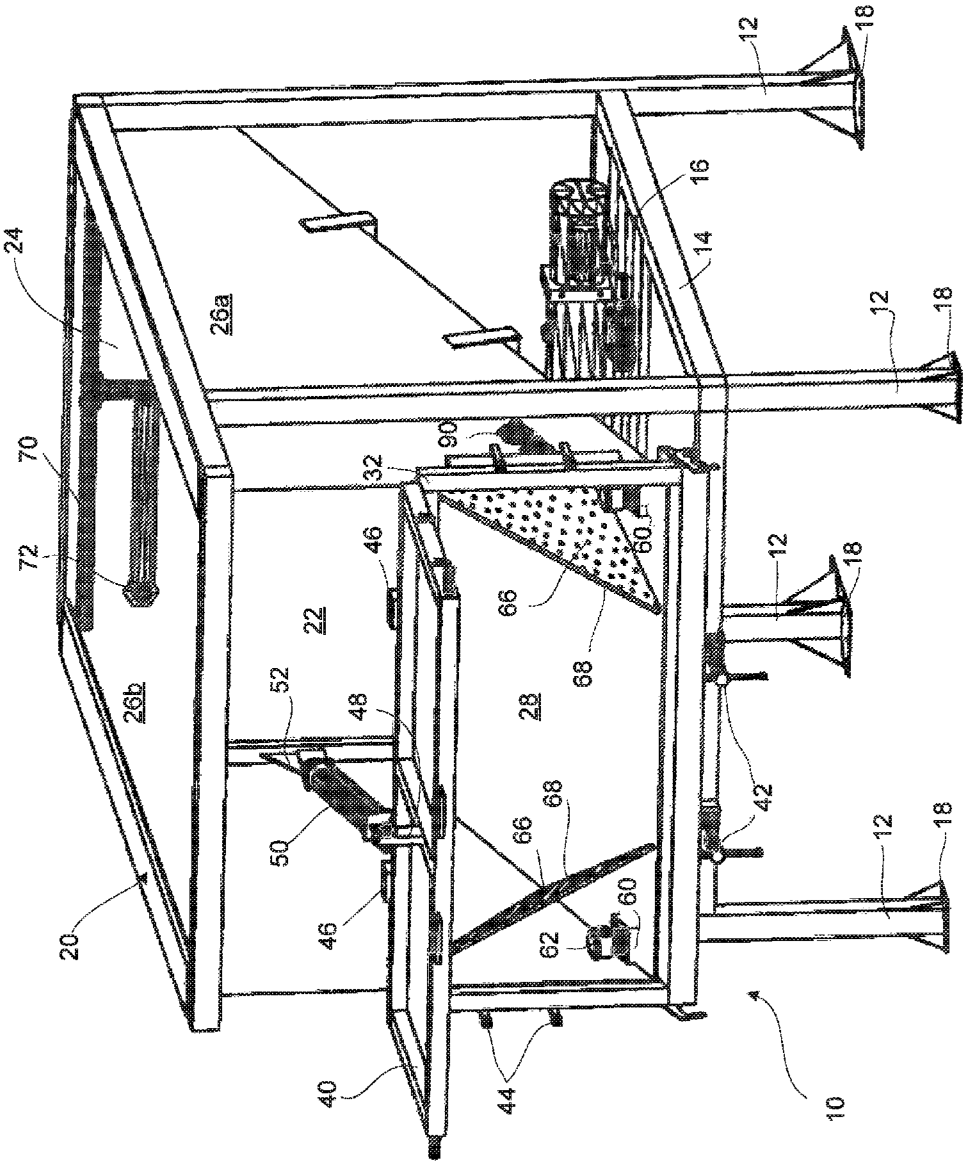
FIG. 1 illustrates a front perspective view of the brine maker device.
Figure 2:
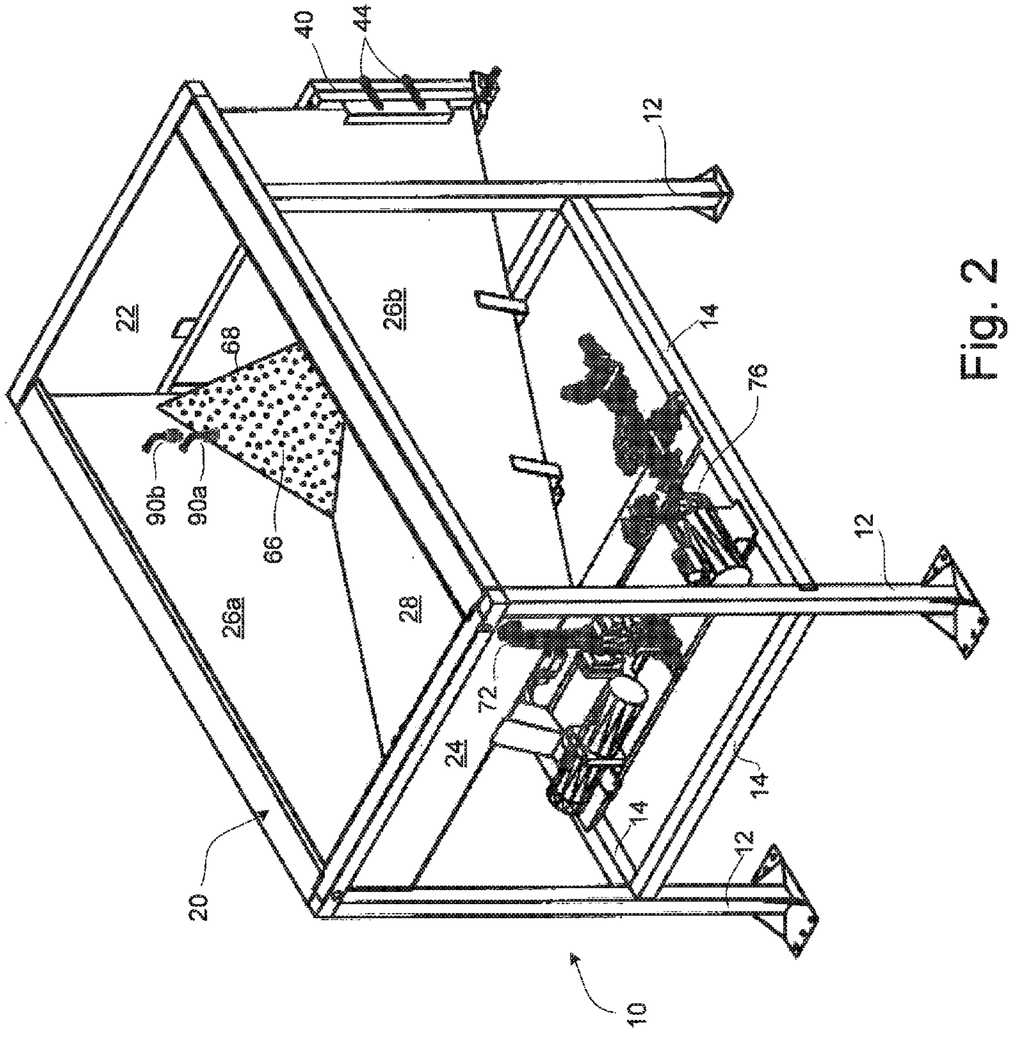
FIG. 2 illustrates a rear perspective view of the brine maker device.

FIGS. 1 and 2 illustrate first and second perspective views of a device 10 utilized to admix solids with liquid solvent to generate a liquid solution. Primarily, the device 10 is described herein as producing salt brine where salt is mixed with water to generate a salt brine solution having a desired salinity. However, it will be appreciated that the device 10 may be utilized to admix other materials and is therefore not limited to the mixing of salts and water.

As shown, the brine maker device 10 is generally formed as a tank having an open upper end into which salt or other materials may be deposited. More specifically, the brine maker 10 includes a hopper 20 that is defined by four vertical sidewalls and a bottom surface. In the present embodiment the brine maker 10 includes a front wall 22, a back wall 24, two sidewalls 26A, 26B, and a bottom surface 28. This bottom surface in various arrangements slopes between the back wall 24 and the front wall 22 to facilitate cleaning of the brine maker 10, as will be more fully discussed herein.

As shown, the hopper 20 is supported above the ground by a frame that includes four vertical legs 12 connected to the outside surface of the hopper. These legs suspend the hopper 20 above the ground such that a front end loader may be positioned beneath the hopper for cleaning purposes as discussed herein. In the present embodiment, the bottom of each leg 12 includes a foot 18 that is adapted for interconnection to an underlying surface. For instance, each foot 18 may be affixed to a concrete pad. In addition, one or more cross supports 14 may extend between the legs 12 and may form a platform beneath the bottom surface of the hopper. In this regard, components (e.g., hydraulic pumps, water pumps, piping, valves, etc.) may be disposed on the platform 16 beneath the hopper and thereby isolated from, for example, potential damage from salt being deposited into the hopper. It will be appreciated that the frame and/or hopper may be made of any appropriate materials. Such materials include, without limitation, carbon steel, stainless steels, and aluminums.

As discussed above, cleaning of brine makers has heretofore been problematic. One problem has been accessing the interior space of the brine maker in a manner that allows for easily removing sediment therefrom. To address this difficulty, the present brine maker 10 utilizes a tailgate or side gate arrangement that provides an opening through a side surface in the hopper 20, which permits an operator easy access into the interior of the hopper for cleaning purposes. In the present embodiment, the tailgate 40 extends entirely across the width of the front wall 22. However, this need not be the case, and in other embodiments, the tailgate 40 may extend across less than an entirety of a sidewall of the hopper 20. As shown in FIGS. 1-4, in the present embodiment a tailgate 40 is pivotally interconnected to the front wall 22 of the hopper 20 utilizing one or more hinges 46. Specifically, in the present embodiment, a top edge of the tailgate 40 is pivotally interconnected to the front wall 22 via first and second hinges 46. However, it will be appreciated that in other embodiments the lower edge or side edge of such a side gate/tailgate 40 may be pivotally interconnected to the hopper. In any arrangement, the tailgate 40 is adapted to move between an open position (e.g., See FIGS. 1 and 3) and a closed position (e.g., See FIGS. 2 and 4). When the tailgate 40 is in the open position, the operator has full access to the interior of the hopper 20 in order to remove sediment that may have accumulated during use. In the closed position, the tailgate pivots into alignment with the front wall 22 and a periphery of the tailgate 40 mates with a gate frame 32 outlining an opening through the front wall 22. A gasket 38 disposed around the periphery of the tailgate 40 is compressed between the periphery of the tailgate and the gate frame 32. That is, when the tailgate 40 is closed and the gasket 38 is compressed, the tailgate 40 seals the opening through the front wall 22. Accordingly, at this time, the hopper 20 is fluid-tight and thereby defines an open-ended tank into which salt may be disposed and mixed with water.

Figure 3:
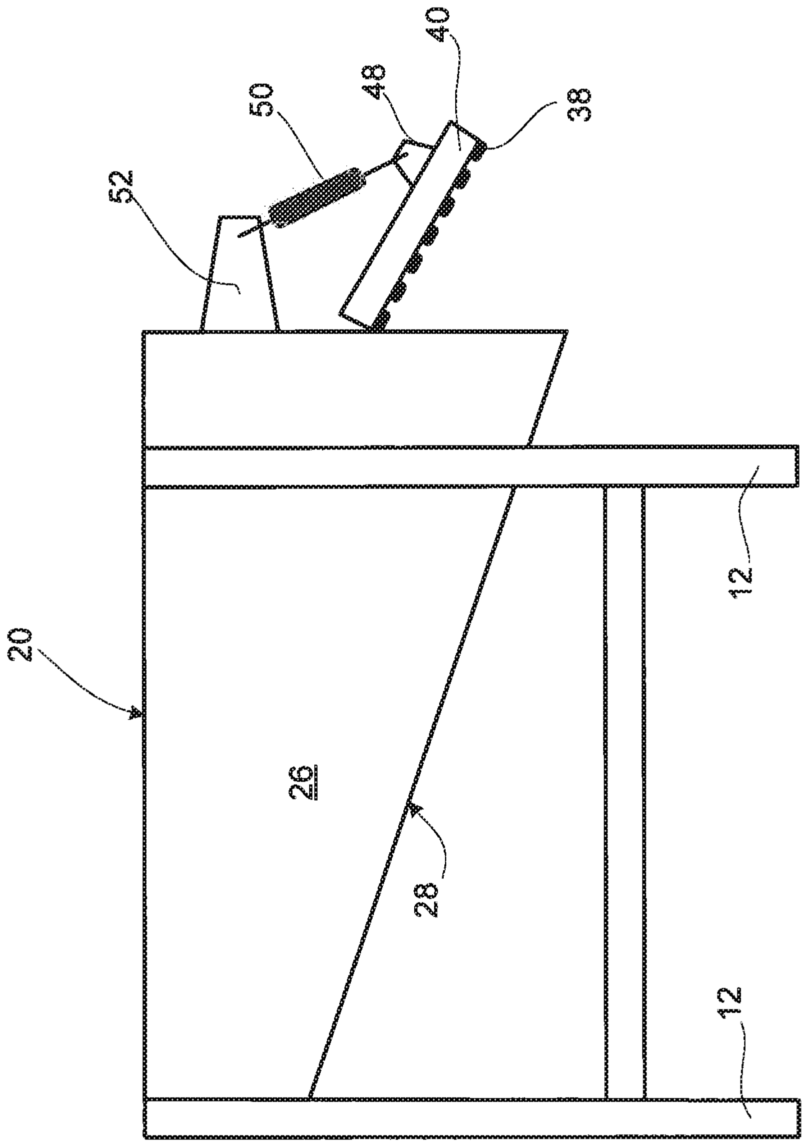
FIG. 3 illustrates a side view of the brine maker device with the tailgate in the open position.
Figure 4:
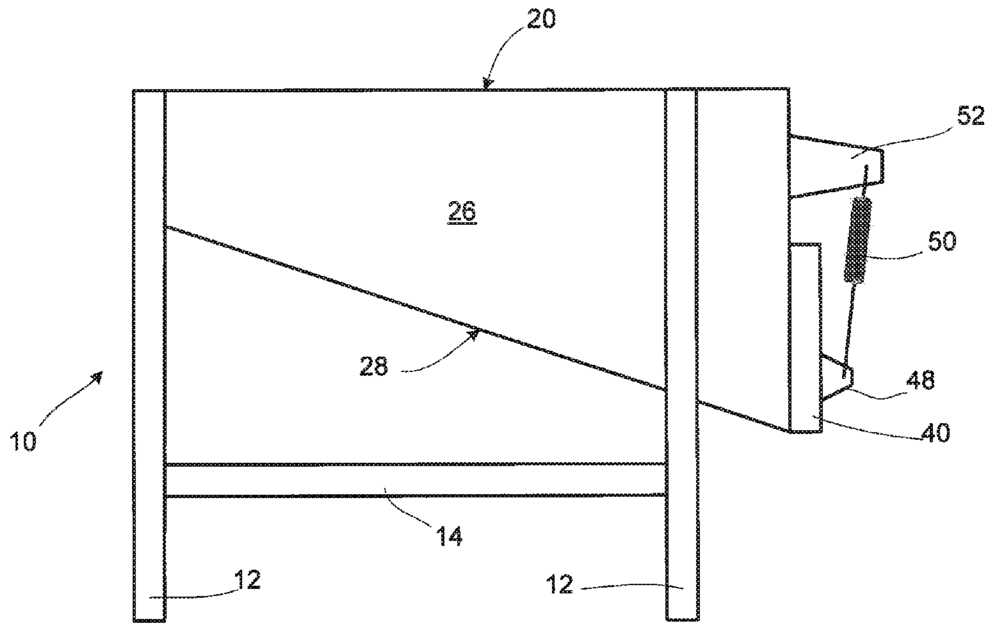
FIG. 4 illustrates a side view of the brine maker device with the tailgate in the closed position.
Figure 5:
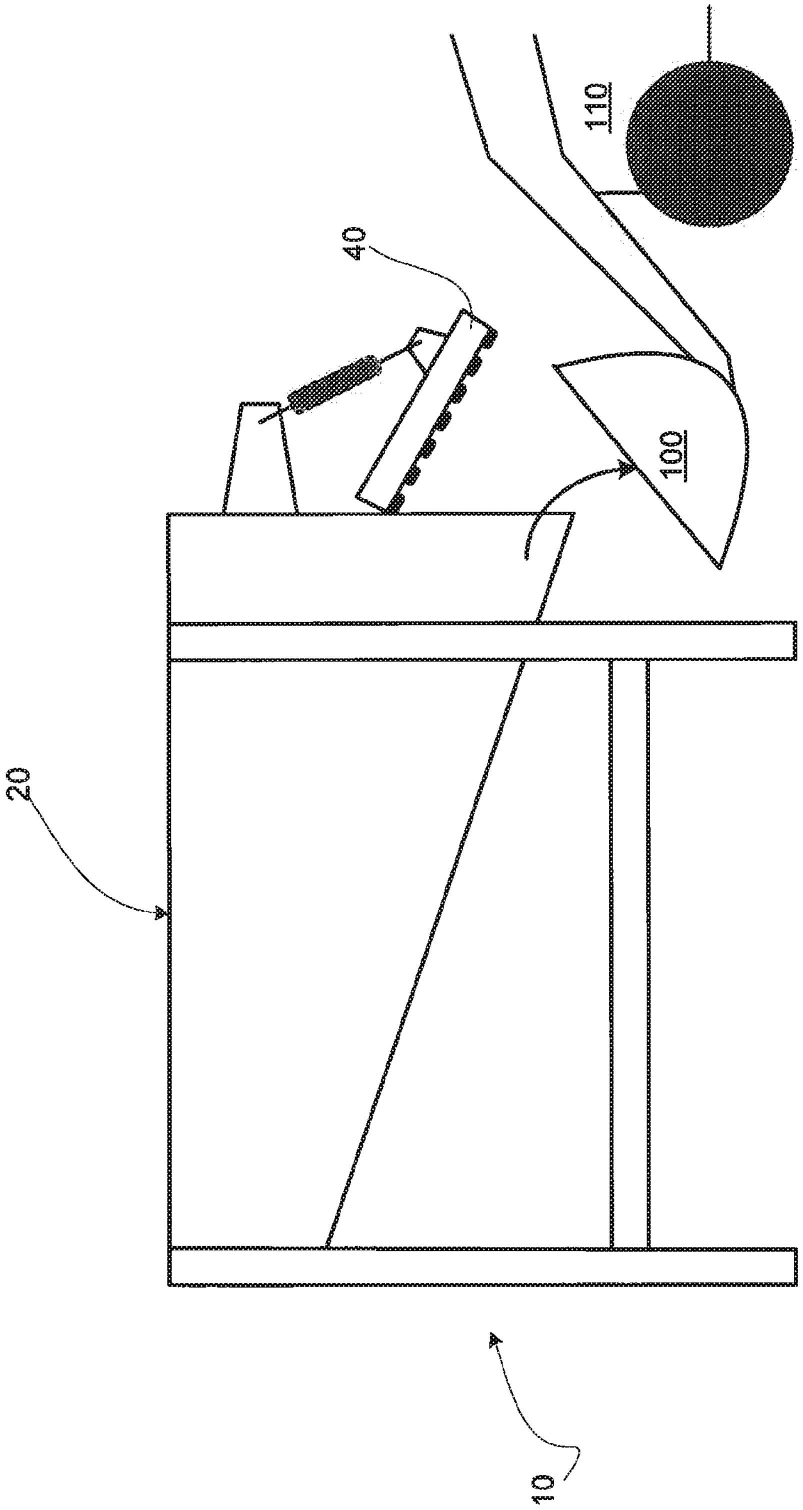
FIG. 5 illustrates positioning a frontend loader beneath the tailgate of the brine maker.

In the present embodiment, a hydraulic cylinder 50 provides an opening and closing mechanism for the tailgate 40. The hydraulic cylinder 50 is operated by a hydraulic pump 54, which may be mounted below the hopper on the platform 16. See FIG. 6. It will be appreciated that the cylinder 50 and the pump 54 will be connected by various hydraulic hoses 82. As shown in FIGS. 1, 3 and 4, the hydraulic cylinder 50 is mounted to the front wall 22 of the hopper 20 by a first support mount 52. A second end of the hydraulic cylinder 50 is interconnected to the tailgate 40 by a second support mount 48. As best illustrated in FIG. 4, the support mount 52 mounted to the front wall 22 of the hopper 20 extends outwardly from the front wall (i.e., which defines a reference plane) further than the second support mount 48 interconnected to the tailgate 40. In this regard, when the hydraulic cylinder 50 is extended, the hydraulic cylinder is operative to apply a compressive force between the first mount 52 and the second mount 48. Furthermore, this provides a moment around the hinges 46 and, thereby, closes the gate and at least partially compresses the gasket 38. In contrast, when the hydraulic cylinder 50 is retracted (e.g., See FIGS. 1 and 3), the cylinder 50 provides a retractive force between the first and second mounts 52, 48 and, thereby, rotates the tailgate 40 into the open position as illustrated in FIGS. 1 and 3.

Figure 7:
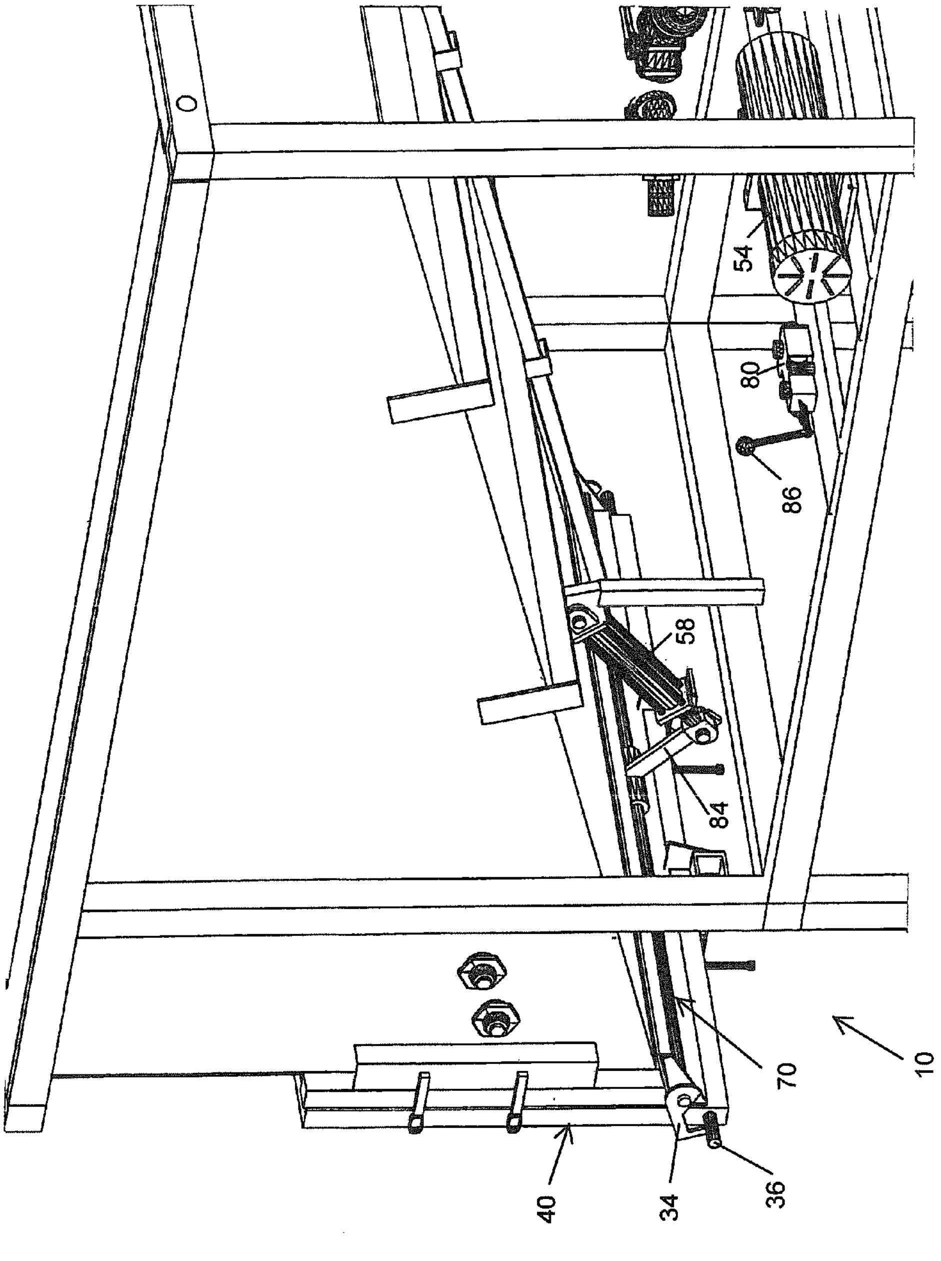
FIG. 7 illustrates a lower hydraulic latching mechanism.

The hydraulic cylinder 50 provides the initial closing force for the tailgate. However, once in the closed position a second cylinder 58 provides a further compressive force to the tailgate and gasket. See FIGS. 1, 2 and 7. This second cylinder 58 is interconnected to a shaft 70 by a pivot linkage 84. This shaft extends across the width of the bottom surface 38 of the device 10 proximate to the front wall 22. Interconnected to each end of the shaft 70 are pin catches 34. As shown in FIGS. 1 and 2, these pin latches are adapted to engage pins 36 interconnected to the bottom outside edges of the tailgate once the tailgate 40 is closed. The pin catches 34 rotate with the shaft 70, which is rotated via extension and retraction of the second hydraulic cylinder 58 as applied through the pivot linkage 84. As the pin catches 34 rotate, they tighten about the pins 36 and further compress the tailgate 40 against the frame.

To maintain compression of the gasket when the hopper is filled with salt and water, the tailgate 40 further includes one or more latching mechanisms for physically locking the tailgate in the closed position. As shown, the side surfaces of the gate frame 32 each include first and second tailgate latches 44. Typically, these latches 44 are adjustable draw latches that allow for adjusting the amount of compressive force applied between the hopper 20 and the tailgate 40. In addition to the side latches 44, first and second bottom latches 42 are attached to the bottom of the frame 32. It will be appreciated that multiple different latches may be utilized. Such latches may include, without limitation, cam latches, threaded latches, turn buckles, etc. What is important is that the latches allow for compressing the tailgate 40 relative to the frame 32 and/or maintaining compression of the gasket 38 in view of the hydraulic pressure of the water and salt within the hopper 20.

As shown in FIGS. 1-4, the bottom surface 28 of the hopper 20 is sloped between the back wall 24 and the front wall 22. That is, the bottom surface attaches to the back wall 24 (i.e., in relation to a support surface/ground) at a higher elevation that the bottom surface 28 connects to the front wall 22. By sloping the bottom surface of the hopper 28 continuously between the back wall and front wall, sediment that may accumulate in the bottom of the hopper is easily removed from the brine maker 10. That is, upon opening the tailgate 40, a front/lower edge of the bottom surface 28 is exposed. Accordingly, an operator may conveniently spray water into the hopper 20 and drain and/or scrape sediment out of the front of the hopper without having to enter into the hopper itself. In one embodiment, the bottom surface 28 slopes at an angle of about 20° between the front and back wall. This slope angle may vary. However, it is believed that having a slope of at least 10° and less than 45° is preferable. On the lower limit, the angle allows for adequately draining materials out of the hopper. On the upper level, the shallower angle allows for extending the length of the hopper, which increases its capacity and facilitates loading the same, as is discussed herein.

As shown in FIGS. 1 and 2, the interior of the hopper 20 includes first and second sediment screens 66. These first and second sediment screens 66 isolate first and second fluid outlets 60 from the main body of the hopper. In this regard, the sediment screens 66 have a plurality of apertures disposed therethrough that limit the amount of granular salt and/or sediment that may pass through. That is, during operation, salt is dumped into the interior of the hopper and water is mixed with the salt to produce the brine solution. More specifically, water is introduced into the hopper until the water level obtains a desired height. The water is received from a fluid inlet 72 and passes through a spray bar 74, which sprays the water onto the salt in order to dissolve the same. The spray bar 74, as illustrated, extends across the back wall of the hopper. However, it will be further appreciated that multiple spray bars may extend across the back wall and/or along the top edges of the sidewalls. In any arrangement, such spray bars typically include a plurality of apertures/holes that allow for directing fluid/water into different areas of the interior of the hopper. Accordingly, this water may be directed over different portions of the salt within the hopper to more readily dissolve the same.

The water typically achieves a desired salinity in a single pass through the hopper. However, if necessary, the water may be removed from the bottom of the hopper and recirculated into the top of the hopper to continue dissolving the salt and saturating the water (i.e., raising the salinity level). In this regard, water from the bottom of the tank is removed from the first and second fluid outlets 60 and recirculated back into the hopper via a recirculating hose or via the fluid inlet and the spray bar 74. In this regard, a pump 78 is provided that is fluidly interconnected to the fluid outlet and the fluid inlet. In this regard, various piping and valves may extend between the outlets 60 and the pump 78 and between the pump 78 and the hopper and/or the fluid inlet 72. Likewise, this pump 78 and/or piping may be interconnected to a water source that allows for initially filling the tank. In any arrangement, the pump 78 is operative to circulate the fluid through the tank. Once a desired salinity is achieved, a user may, for example, open a valve and pump or drain the brine solution from the hopper into, for example, a brine storage tank or into a truck that will be applying the brine to a roadway surface. Once the brine is drained from the hopper, fresh water may be reintroduced to continue dissolving the salt within the hopper.

The screens 66 prevent the salt from entering into the fluid outlets. Furthermore, these screens prevent at least a portion of the sediment within the salt from passing into the fluid outlets. In the present arrangement, to further limit the amount of sediment that is in the brine, the first and second fluid outlets 60 each include a screened vent cap 62. In this regard, the screens of the vent cap 62 may be finer than the screens 66 that isolate the outlets from the hopper. In this regard, additional sediment may be removed from the brine.

While the screens 66 prevent most sediment from entering into the outlet area beneath/enclosed by these screens, some sediment does pass into the outlet area. Accordingly, this sediment must also be removed from the brine maker 10 during cleaning. To facilitate the removal of sediment from this area, the present embodiment utilizes screens 66 that have an open end to allow for access into the interior area defined by these screens. That is, an edge surface 68 of each of these screens 66 abuts against an inside surface of the tailgate 40 when the tailgate is closed. As shown in FIG. 2, when the tailgate 40 is closed the screen 66 isolates the fluid outlet from the main interior area of the hopper. However, when the tailgate is open (See FIG. 1), an operator may readily clean out the interior area underneath the screen 66. Furthermore, in one embodiment the screens are angled to reduce the amount of sediment that builds up on the screens themselves. Accordingly, during cleaning, the user may open the tailgate 40, spray out the inside of the hopper, and spray off the screens.

To further facilitate the cleaning of the hopper 20, the width of the hopper may be less than the width of a bucket of a frontend loader. In this regard, prior to opening the tailgate, the bucket of such a frontend loader may be disposed beneath the tailgate. As best shown in FIGS. 2-5, the front legs 12 of the frame of the brine maker 10 are set back from the front wall 22 of the hopper 20. This allows disposing the bucket 100 of a frontend loader 110 directly beneath the tailgate 40. See FIG. 5. At such time, the tailgate may be opened and any sediment, remaining salt, and/or water within the hopper 20 may be spilled directly into the bucket of the loader. Further, at such time, a user may wash and/or scrape out the interior of the hopper directly into the bucket 100 of the loader 110.

While the width of the hopper 20 is preferably less than the width of the bucket of a frontend loader, the length of the sidewalls 26A, 26B is typically greater than the width of such a bucket. In this regard, when dumping salt over the side surface of the hopper, the hopper is long enough such that no spillage occurs over the front and back walls. In this regard, the width to length ratio of the hopper is typically less than one and more commonly less than about 0.8.

As illustrated in FIG. 2, the brine maker device 10 may include one or more floats 90 that allow for automated operation of the brine maker. As will be appreciated, such floats typically have a specific gravity that allows the floats to move when the salinity of the solution within the hopper reaches a desired level. For instance, the lower float 90A may have a specific gravity that corresponds with a desired salinity (e.g., approximately 23.3% by weight NACL). Accordingly, water may sit in the hopper and/or the pump 78 may re-circulate fluid until the salinity reaches a level such that the lower float 90A rises. At this time, the recirculating pump may cease operation, and an indication may be provided that the brine has reached the desired level. The upper float 90B may provide an indication of overfilling and/or clogging of the outlet pumps. Accordingly, if this float is activated, the pump may stop, and a maintenance warning may be issued. In addition to the floats 90A, 90B, water level sensors 92A, 92B (See FIG. 1) may be provided that allow for automatically introducing water to a desired level into the interior of the hopper. In this regard, these water level sensors 92A, 92B may allow for controlling the opening and closing of a water inlet valve associated with a water source.

Figure 6:
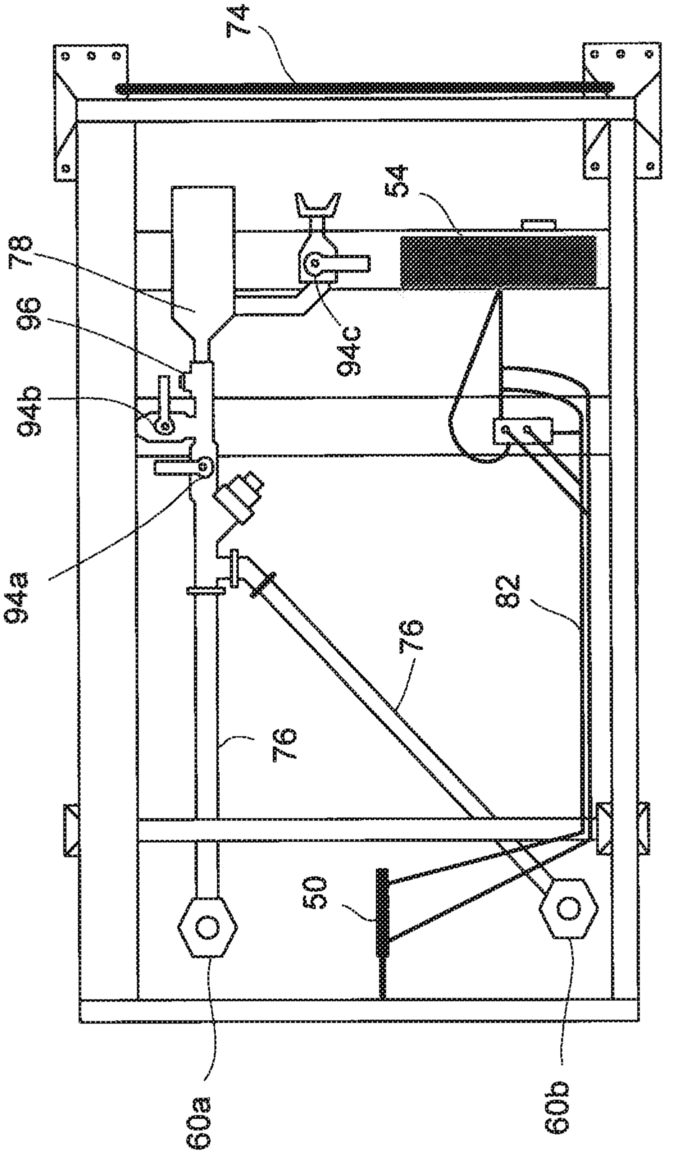
FIG. 6 illustrates the ducting and control componentry of the brine maker.

FIG. 6 illustrates components of the brine maker 10 that are disposed on the platform 16 beneath the hopper. As shown, the first and second outlets 60A, 60B are interconnected to a fluid pump 78 via connecting pipes 76. One or more filters 98 may be disposed within one or more of the pipes. As shown, a number of valves 94A-C are disposed within this plumbing. Accordingly, by operating these valves a user may selectively direct the output of the pump. For instance, a first valve 94A may be closed, and a second valve 94B may be opened to provide an inlet into the system. That is, this valve may be connected to a brine truck to offload brine. A further valve 94C may be utilized to output water or brine from the hopper to, for example, a storage tank or tanker truck. A recirculating hose (not shown) may be connected to this valve 94C and disposed over the top edge of the hopper for recirculation. In other arrangements, the pump may be connected to the spray bar 74. In the present embodiment, an electric motor runs the pump 78. However, it will be appreciated in other arrangements hydraulic pumps may be utilized. Such arrangements may be utilized for remote applications where the device is operated utilizing a power takeoff of a tractor or other industrial machine. In other arrangements, the power source may be provided by off grid sources such as, without limitation, wind turbines and/or solar panels.

In one arrangement, a salinity test point 96 is provided. In various arrangements, the salinity test point 96 may allow a user to draw brine from the plumbing in order to manually test the salinity of the brine. In other arrangements, automated salinity detection devices may be incorporated into the salinity test point. In this regard, the salinity test point 96 may include a measurement device that measures the specific gravity of the brine. Accordingly, in such an arrangement the system may be operative to add water (e.g., via the test point, which may be connected to a water source) to reduce the salinity or continue circulating the water in the tank until a desired salinity is achieved. Also mounted to the platform beneath the hopper is a hydraulic control system 80 that controls the operation of the first hydraulic cylinder 50 and second hydraulic cylinder. In this arrangement, the hydraulic control system includes a user control handle 86 and hydraulic pump 54 that is interconnected to the cylinders 50, 58 via various hydraulic lines 82. A user opens and closes the tailgate by actuating the user control handle 86. Also included in the hydraulic control system is a hydraulic synchronizing valve 84. This valve 84 synchronizes the operation of the two hydraulic cylinders. Specifically during closing, the synchronizing valve 84 directs hydraulic fluid such that the first cylinder 50 moves the tailgate from the open position to the closed position before the second cylinder 58 rotates the shaft 70 to lock the bottom of the tailgate. Likewise, during opening, the synchronizing valve directs fluid to operate the second cylinder 58 to rotate the shaft 70 and release the tailgate prior to the first cylinder moving the tailgate from the closed position to the open position. It will be appreciated that other components may be mounted to the platform and/or the hopper. For instance, a vibrator may be connected to the hopper to provide agitation to materials therein to improve the mixing process.

The foregoing description of the presented inventions has been presented for purposes of illustration and description. Furthermore, the description is not intended to limit the inventions to the forms disclosed herein. Consequently, variations and modifications commensurate with the above teachings, and skill and knowledge of the relevant art, are within the scope of the presented inventions. The embodiments described hereinabove are further intended to explain best modes known of practicing the inventions and to enable others skilled in the art to utilize the inventions in such or other embodiments and with various modifications required by the particular application(s) or use(s) of the presented inventions. It is intended that the appended claims be construed to include alternative embodiments to the extent permitted by the prior art.

The invention claimed is:

1. An apparatus for admixing solids with a solvent to produce a liquid solution suitable for snow and ice removal, comprising:

a hopper including:

a continuous sidewall having an open upper end; and a bottom surface that slopes from a first inside edge of said continuous sidewall to an opposing second inside edge of said continuous sidewall, wherein said bottom surface slopes from a first elevation at said first inside edge to a second elevation at said second inside edge, wherein said first elevation is greater than said second elevation;

a side gate movable between an open position and a closed position relative to an opening in said continuous sidewall, wherein in the open position a lower edge of said bottom surface of said hopper is exposed and wherein in said closed position said side gate seals with said continuous sidewall to cover said opening, wherein said side gate, said continuous sidewall and said bottom surface of said hopper form a liquid tight tank;

a fluid inlet for introducing water into the hopper; and a fluid outlet extending through said bottom surface proximate to said lower edge of said bottom surface, wherein said fluid outlet is fluidly connectable to a storage tank.

2. The apparatus of claim 1, wherein said bottom surface slopes continuously from said first inside edge to said second inside edge.

3. The apparatus of claim 1, wherein said continuous sidewall comprises:

a front wall;

a back wall; and first and second sidewalls extending between said front and back walls, wherein said bottom surface slopes from the first elevation on the back wall to the second elevation on the front wall and wherein the side gate is connected to the front wall.

4. The apparatus of claim 3, wherein the side gate extends across an entirety of a width of the front wall, wherein in the open position substantially the entire lower edge of the bottom surface is exposed.

5. The apparatus of claim 3, wherein the front and back walls have a common width and the first and second sidewalls have a common length, and wherein a ratio of the common width divided by the common length is less than 1.

6. The apparatus of claim 5, wherein said ratio is less than 0.8.

7. The apparatus of claim 1, wherein said side gate further comprises:

a gasket disposed about at least a portion of a periphery of the side gate, wherein said gasket is compressed between said side gate and said continuous sidewall when said side gate is in the closed position.

8. The apparatus of claim 7, further comprising:

a latch having a first portion attached to said continuous sidewall and a second portion attached to said side gate, wherein said latch is operative to compress said gasket.

9. The apparatus of claim 8, wherein said latch includes:

a hydraulic cylinder.

10. The apparatus of claim 1, further comprising:

a pump, wherein said pump is selectively operable to pump fluid removed through said fluid outlet to said fluid inlet.

11. The apparatus of claim 10, further comprising:

a salinity measurement device for measuring a salinity of fluid exiting the fluid outlet.

12. The apparatus of claim 1, wherein a top edge of said side gate is pivotally connected to said continuous sidewall.

13. The apparatus of claim 1, wherein said fluid inlet further comprises:

a spray bar having a plurality of holes to allow fluid to pass through said spray bar.

14. The apparatus of claim 1, further comprising:

a screen disposed over said fluid outlet.

15. The apparatus of claim 14, wherein said screen has an open end, wherein said open end is covered by said side gate when said side gate is in said closed position.

* * * * *